Patented May 11, 1926.

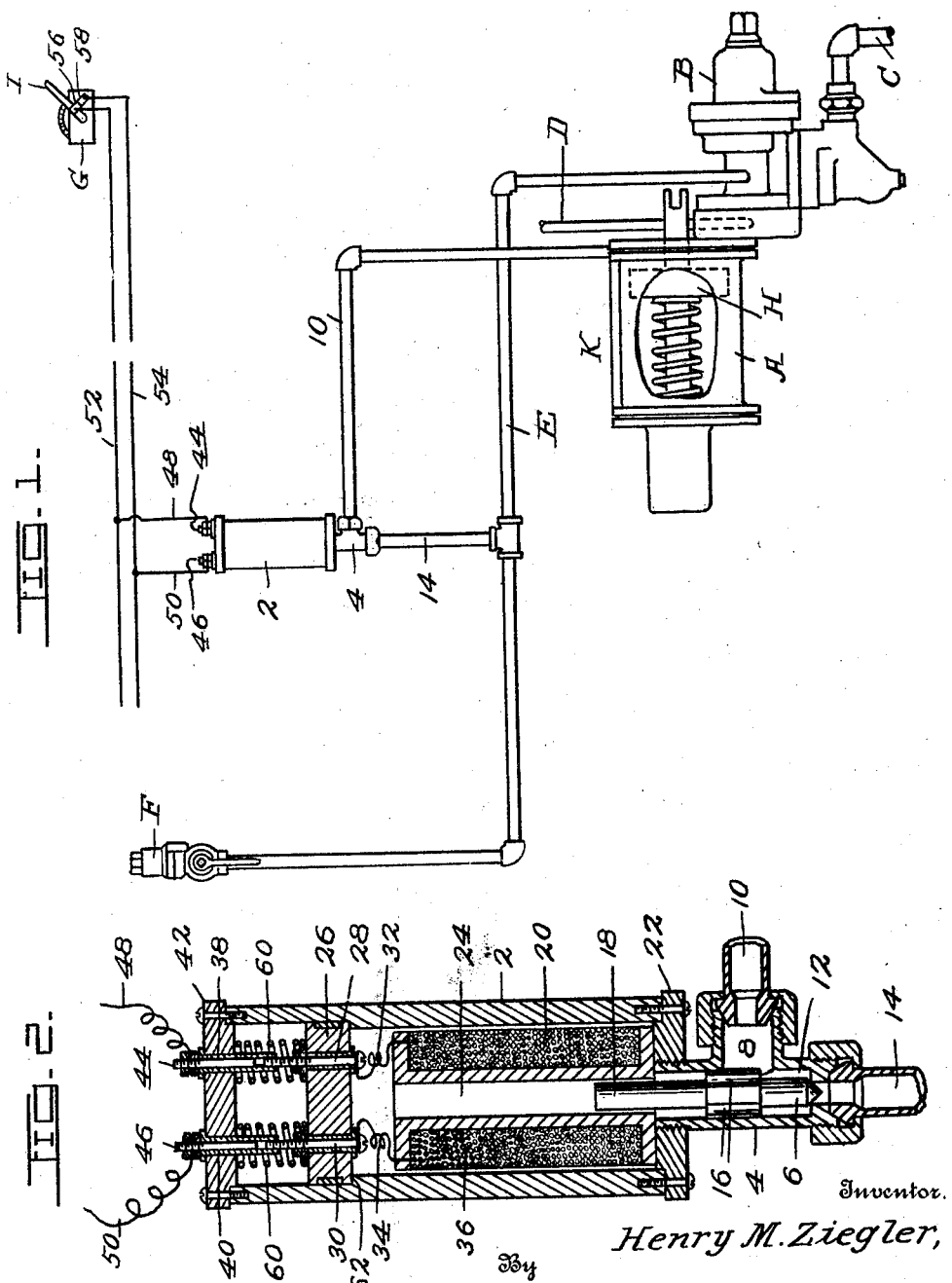

UNITED STATES PATENT OFFICE.

HENRY M. ZIEGLER, OF SALINA, KANSAS.

ELECTRIC AUXILIARY BRAKE RELEASE.

Application filed October 7, 1925. Serial No. 61,020.

In the operation of air brake systems on railway cars the triple valves at times get out of order and fail to permit the compressed air in the brake cylinders to escape when the engineer's valve is adjusted to running position, or a leaky train pipe may cause the air pressure to build up in the brake cylinders and cause the brakes to creep on and cause more or less damage while the train is running.

By the use of my invention provision is made for allowing the compressed air to escape from the brake cylinders throughout such times as the engineer's valve is set in running position, thereby positively effecting release of the brakes and preventing them from creeping on as above-mentioned.

In order that my invention may be fully understood, reference will now be had to the accompanying drawing, in which:

Fig. 1 is a diagram of that portion of an air brake system to which my invention is applied.

Fig. 2 is a longitudinal section of a relief valve and associated parts constituting important features of the invention.

Referring now in detail to the different parts, A designates an air brake cylinder; B a triple valve which is connected to said brake cylinder A; C a branch pipe leading from the train line, not shown, to the triple valve B; D a pipe leading from the auxiliary reservoir, not shown, to the triple valve B; E an exhaust pipe leading from the triple valve B; F an air retaining valve on the discharge end of the exhaust pipe E; and G the engineer's valve. The foregoing mechanism may be of any well known type and in which the triple valve B performs the usual function of admitting and releasing compressed air from the brake cylinder A.

Referring now more particularly to my invention, 2 designates a cylindrical casing provided at one end with a valve 4 having a self-closing plug 6. The valve 4 is provided with an inlet port 8 having direct communication with the interior of the brake cylinder A at a point in front of the piston H through a pipe 10, and an outlet port 12 communicating with the pipe E through a pipe 14. The inlet port 8 is at all times in communication with the interior of the casing 2 through longitudinal grooves 16 in the enlarged portion of the valve plug 6.

The upper portion of the valve plug 6 has an extension 18, which constitutes the core of a solenoid 20 secured to the lower cylinder head 22. The solenoid 20 has a central opening 24 extending therethrough for the passage of air under pressure to a piston 26, operably mounted in the upper portion of the casing 2. The piston 26 is provided with a pair of fixedly mounted contacts 28 and 30, which are connected to the terminals 32 and 34, respectively, of the solenoid winding 36.

The upper ends of the contacts 28 and 30 project into the lower ends of tubular guides 38 and 40, respectively, consisting of fiber or other insulation and secured in the upper cylinder head 42. The guides 38 and 40 are provided with contacts 44 and 46 connected by wires 48 and 50 to mains 52 and 54, respectively, which are connected to a generator, storage battery, or other source of electrical energy, not shown. The main 52 is connected at one end to a switch blade 56, while the main 54 is connected to a switch contact 58 adapted to be engaged by said blade 56.

The switch blade 56 is insulated from but mounted upon the lever I of the engineer's valve G, while the contact 58 is insulated from but fixedly mounted upon the casing of said valve G.

Coil springs 60 are interposed between the cylinder head 42 and the piston 26 to yieldably hold the latter down upon an annular shoulder 62 arranged inside of the casing 2, for the purpose of yieldably holding the contacts 28 and 30 out of engagement with the contacts 44 and 46, respectively.

In practice, when the brakes are applied a portion of the compressed air admitted to the brake cylinder A escapes through the pipe 10, and passing upwardly through the valve 4 and the opening 24 in the solenoid, impinges against the underside of the piston 26, thereby forcing the same upwardly until the contacts 28 and 30 engage the companion contacts 44 and 46, respectively. Should the brakes fail to release when the engineer's valve G is adjusted to running position, due to a faulty triple valve B or other defect in the air brake system, resulting in retention of the air under pressure in the brake cylinder A, the valve plug 6 is attracted from its seat by the magnetism of the solenoid 20, which becomes energized as the switch blade 52 engages the contact 58 at the time the lever I of the engineeer's valve G is adjusted to running position. Opening of the valve plug 6 permits the compressed air to escape from the brake cylinder A to atmosphere through the pipe 10, the valve 4, the pipe 14, the pipe E, and the valve F, thereby permitting the spring K to restore the piston H to normal and thus release the brakes.

When the circuit is closed by the switch blade 52, the contacts 58, 28, 30, 44 and 46, the current flows through the main 52, wire 48, the solenoid winding 36, wire 50, and the main 24 and energizes said winding 36, as above referred to. After the air under pressure has escaped from the brake cylinder A, as above described, the springs 60 force the piston 26 down upon the shoulder 62. As the piston 26 moves downwardly it carries the contacts 28 and 30 out of engagement with the contacts 44 and 46, thereby opening the circuit and deenergizing the solenoid 20, whereupon the valve plug 6 drops to closed position.

The cylinder 2 and its associate parts are preferably applied to each car of a train, but the mains 52 and 54 may extend throughout the length of the train and be provided at the ends of each car with any well-known type of coupling means which may be connected or disconnected at the time the cars are coupled or uncoupled. In instances where the triple valve B exhausts directly to atmosphere instead of through the pipe E and valve F, the pipe 14 may be dispensed with to allow the valve 4 to discharge to atmosphere through port 12.

While I have shown and described the preferred form of my invention, I reserve the right to such changes and modifications thereof as properly fall within the spirit and scope of the invention as claimed.

Having thus described my invention, what I claim and desire to secure by Letters Patent, is:

1. In combination with the brake cylinder of an air brake system, an electric circuit, means adapted to be actuated by air under pressure from said brake cylinder and partially close said circuit, manually controlled means for completing the closure of said circuit, valve-opening means which is energized by the circuit when the same is closed, and a valve which is opened by said valve-opening means and permits air to escape from the brake cylinder.

2. In combination with the brake cylinder of an air brake system, a casing communicating with said brake cylinder, an electric circuit, means within said casing adapted to be actuated by air under pressure from the brake cylinder and partially close said circuit, a switch for completing the closure of said circuit, valve-opening means which is energized by the circuit when the same is closed, and a self-closing valve which is opened by said valve-opening means and permits air to escape from the brake cylinder and the casing.

3. In combination with the brake cylinder of an air brake system, a casing communicating with said brake cylinder, a piston operably mounted in said casing and adapted to be moved in one direction by air under pressure from the brake cylinder, an electric circuit which is partially closed by said piston as the same is actuated by the air under pressure, manually-controlled means for completing the closure of said circuit, magnetic means which is energized when the circuit is closed, and a normally closed valve controlling an air outlet from the casing and the brake cylinder and which is opened by said magnetic means when the same is energized.

4. In combination with the brake cylinder and engineer's valve of an air brake system, a casing communicating with said brake cylinder, a piston operably mounted within said casing and adapted to be moved in one direction by air under pressure from said brake cylinder, an electric circuit which is partially closed by said piston as the same is actuated by the air under pressure, a switch actuated by the engineer's valve to complete the closure of said circuit when the engineer's valve is adjusted to running position, means which is energized when the circuit is closed, and a normally closed valve controlling an air outlet from the casing and the brake cylinder and which is opened when said means is energized.

5. In an air brake system, a casing, a valve communicating with said casing and the atmosphere, a piston mounted in said casing, contacts carried by said piston, magnetic means connected to said contacts and adapted when energized to open said valve, and contacts supported by the casing and arranged in the path of the first-mentioned contacts.

6. In an air brake system, a casing, a valve communicating with said casing and the atmosphere, a piston mounted in said casing, spring means for normally holding said piston in one position, contacts carried by said piston, electrically-controlled means connected to said contacts and adapted when energized to open said valve, contacts supported by the casing and arranged in the path of the first-mentioned contacts, and a circuit controlled by said contacts.

In testimony whereof I affix my signature.

HENRY M. ZIEGLER.